United States Patent
Singh et al.

(10) Patent No.: US 12,089,225 B2
(45) Date of Patent: Sep. 10, 2024

(54) REDUCED SPECTRUM ALLOCATION IN CBRS NETWORKS

(71) Applicant: CHARTER COMMUNICATIONS OPERATING, LLC, St. Louis, MO (US)

(72) Inventors: Lakhbir Singh, Aurora, CO (US); Ramneek S. Bali, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 357 days.

(21) Appl. No.: 17/541,468

(22) Filed: Dec. 3, 2021

(65) Prior Publication Data

US 2023/0180246 A1 Jun. 8, 2023

(51) Int. Cl.
*H04W 4/00* (2018.01)
*H04W 72/23* (2023.01)
*G16Y 40/00* (2020.01)

(52) U.S. Cl.
CPC ............. *H04W 72/23* (2023.01); *G16Y 40/00* (2020.01)

(58) Field of Classification Search
CPC ............................... H04W 72/33; G16Y 40/00
See application file for complete search history.

(56) References Cited

U.S. PATENT DOCUMENTS

| | | | |
|---|---|---|---|
| 10,893,417 B1* | 1/2021 | Gandhi | H04W 48/08 |
| 11,089,602 B2* | 8/2021 | Sheriff | H04W 24/02 |
| 11,956,674 B2* | 4/2024 | Mueller | H04W 76/36 |
| 2019/0150134 A1* | 5/2019 | Kakinada | H04W 16/14 370/330 |
| 2019/0364565 A1 | 11/2019 | Hmimy et al. | |
| 2020/0037175 A1* | 1/2020 | Sevindik | H04W 92/20 |
| 2020/0275457 A1 | 8/2020 | Hmimy | |
| 2020/0305159 A1* | 9/2020 | Raghothaman | H04W 72/0453 |
| 2021/0022007 A1 | 1/2021 | McFadden et al. | |
| 2021/0195484 A1* | 6/2021 | Khawer | H04W 36/32 |
| 2021/0211880 A1* | 7/2021 | Khawer | H04W 60/06 |
| 2021/0211889 A1* | 7/2021 | Buddhikot | H04W 72/51 |
| 2021/0219144 A1* | 7/2021 | Schwengler | H04W 48/14 |
| 2022/0007200 A1* | 1/2022 | Sevindik | H04W 52/143 |
| 2022/0110079 A1* | 4/2022 | Singh | H04W 60/04 |
| 2022/0150712 A1* | 5/2022 | Sevindik | H04W 24/10 |

(Continued)

OTHER PUBLICATIONS

Kulacz et al., "Coordinated Spectrum Allocation and Coexistence Management in CBRS-SAS Wireless Networks," Sep. 11, 2019, IEEE Access, pp. 1-23. (Year: 2019).*

(Continued)

*Primary Examiner* — Elisabeth Benoit Magloire
(74) *Attorney, Agent, or Firm* — Patent Beach PC

(57) ABSTRACT

Various embodiments comprise systems, methods, architectures, mechanisms and apparatus for enabling dynamic configuration of CBSD devices with CBRS spectrum grants defined/sized using enhanced SAS channel assignment capabilities supporting low bandwidth channels/applications (e.g., IoT services) in the shared spectrum while minimizing spectrum wastage. Existing CBSD-SAS call flow message exchange and registration data specifications are modified in accordance with various embodiments to provide support for radio types having spectrum requirements less than the nominal minimum channel size.

20 Claims, 3 Drawing Sheets

(56) References Cited

U.S. PATENT DOCUMENTS

| | | | | |
|---|---|---|---|---|
| 2022/0303782 A1* | 9/2022 | Litjens | ................. | H04W 16/14 |
| 2022/0394491 A1* | 12/2022 | Khawer | ................ | H04W 12/06 |
| 2022/0400487 A1* | 12/2022 | Sevindik | ............... | H04W 72/51 |
| 2022/0417761 A1* | 12/2022 | Khawer | ................ | H04W 16/14 |
| 2023/0007497 A1* | 1/2023 | Singh | .................... | H04W 16/14 |
| 2023/0057805 A1* | 2/2023 | Sevindik | ............... | H04L 5/0048 |
| 2023/0131512 A1* | 4/2023 | Furuichi | ............ | H04W 52/243 |
| | | | | 455/454 |

OTHER PUBLICATIONS

Wireless Innovation Forum, "Signal Protocols and Procedures for Citizens Broadband Radio (CBRS): Spectrum Access System (SAS—Citizens Broadband Radio Service Device (CBSD) Interface Technical Specification", Document WINNF-TS-0016, Version V1.2.6, Nov. 25, 2020.

* cited by examiner

REDUCED SPECTRUM ALLOCATION IN CBRS NETWORKS

FIELD OF THE DISCLOSURE

The present disclosure generally relates to wireless communications systems and related networks, and more particularly to supporting low bandwidth grants of CBRS spectrum.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as 5th Generation New Radio (5G-NR) as described in various documents of the Third Generation Partnership Project (3GPP), are increasingly relying on wireless macrocell radio access networks (RANs) such as traditional cellular base stations, eNBs and the like, along with wireless small cell or microcell RANs in order to deploy, for example, indoor voice and data services to enterprises and other customers. For both macrocell RANs and small/micro cell RANs, increasing demands for wireless throughput make access to additional spectrum desirable, including both licensed and unlicensed spectrum.

Unlicensed spectrum may comprise, illustratively, the Citizens Broadband Radio Service (CBRS) band at ~3.5 GHz which is utilized by Citizens Broadband Radio Service Devices (CBSDs) registered with a Spectrum Access System (SAS) capable of adapting CBSD operation in accordance with the Generic Authorized Access (GAA) requirements, network congestion, network interference and the like. The SAS performs various functions such as determining/assigning frequencies, operating parameters (e.g., transmission power on those frequencies), and the like to CBSDs such as within a mobile network.

Each of the CBSDs may connect to the SAS directly or via a domain proxy, which aggregates SAS messaging from multiple CBSDs and hides network topology and other information from external networks, including the SAS.

CBRS spectrum is allocated by a Spectrum Access System (SAS) in relatively large "chunks" such as 10 MHz (i.e., the size of a PAL reserved channel, for the spectral region from 3550 MHz to 3700 MHZ). However, assigning 10 MHz for IoT services requiring less than 10 MHz is wasteful, such as in the following situations: Cat-M1 requires 1.4 MHz, Cat-M2 requires 5 MHz, narrow band IoT (NB-IOT) requires 200 KHz.

SUMMARY

Various deficiencies in the prior art are addressed by systems, methods, and apparatus for enabling dynamic configuration of CBSD devices with CBRS spectrum grants defined/sized using enhanced SAS channel assignment capabilities supporting low bandwidth channels/applications (e.g., IoT services) in the shared spectrum while minimizing spectrum wastage. Existing CBSD-SAS call flow message exchange and registration data specifications are modified in accordance with various embodiments to provide support for radio types having spectrum requirements less than the nominal 10 MHz (or 5 MHz) minimum channel size, such as Cat-M1 (1.4 MHZ), Cat-M2 (5 MHz), narrow band IoT (NB-IOT) (200 kHz).

The various embodiments include a method, comprising: receiving, at a spectrum access server (SAS), a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD; in response to receiving a spectrum inquiry request from a registered non-broadband CBSD, configuring an available broadband spectral region as a plurality of available non-broadband spectral regions; and in response to receiving a grant request from a non-broadband CBSD, granting to the requesting non-broadband CBSD an appropriately sized one of the available non-broadband spectral regions.

The various embodiments include a spectrum access server (SAS) configured to communicate with a plurality of Citizens Broadband Radio Service Devices (CBSDs), the SAS comprising processing resources configured to execute software instructions stored in non-transitory memory resources to provide thereby a method, comprising: receiving a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD; in response to receiving a spectrum inquiry request from a non-broadband CBSD, configuring an available broadband spectral region as a plurality of available non-broadband spectral regions; and in response to receiving a grant request from a non-broadband CBSD, granting to the requesting non-broadband CBSD an appropriately sized one of the available non-broadband spectral regions.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
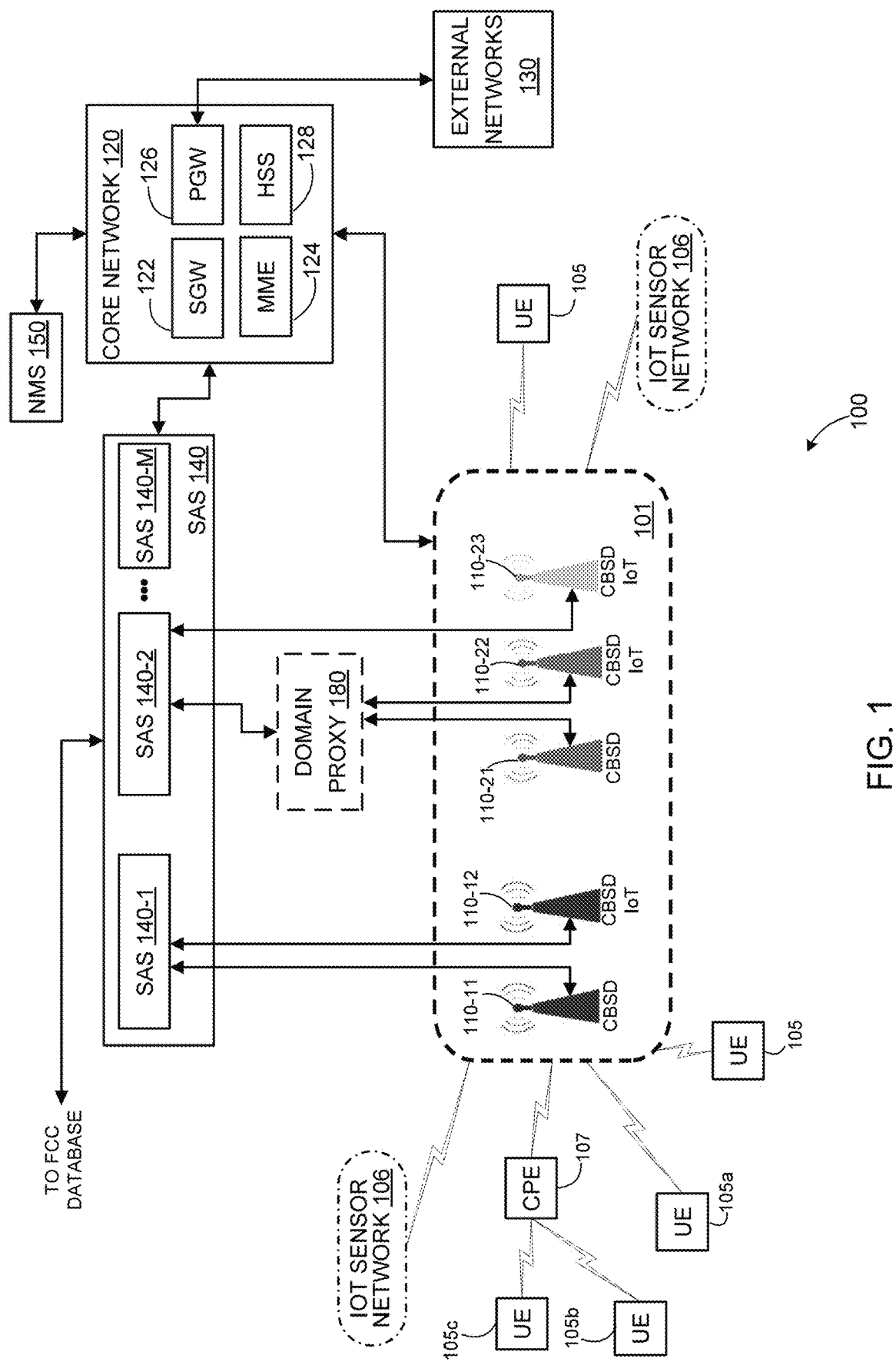
FIG. 1 depicts a block diagram of a network architecture benefiting from the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed by systems, methods, and apparatus for enabling dynamic configuration of CBSD devices with CBRS spectrum grants defined/sized using enhanced SAS channel assignment capabilities supporting low bandwidth channels/applications (e.g., IoT services) in the shared spectrum while minimizing spectrum wastage. Existing CBSD-SAS call flow message exchange and registration data specifications are modified in accordance with various embodiments to provide support for radio types having spectrum requirements less than the nominal 10 MHz minimum channel size, such as Cat-M1 (1.4 MHZ), Cat-M2 (5 MHz), narrow band IoT (NB-IOT) (200 KHz).

FIG. 1 depicts a block diagram of a network architecture benefiting from the various embodiments. Specifically, the network architecture 100 of FIG. 1 as depicted includes a access network 101 including a plurality of deployed network nodes 110 communicatively coupled to a core network 120 and configured to wirelessly communicate with, and provide backhaul services to, user equipment (UE) 105, IoT networks 106, and/or other devices.

The network nodes 110 may include those that use (or are compatible with) mobile network protocols to communicate with UE 105 and/or IoT sensors/devices 106 via unlicensed spectrum, such as may be implemented as macrocells, small cells, microcells and the like such as eNodeBs (eNBs), cellular network base stations, 4G/LTE or 5G repeaters, and similar types of provider equipment (PE) or logical radio nodes (e.g., gNBs) derived therefrom. The network nodes 110 may include nodes that use licensed 3G/4G/LTE/5G spectrum, unlicensed spectrum such as citizens broadband radio service (CBRS) spectrum, or a combination of licensed and unlicensed spectrum. The network nodes 110 may include mid-band (e.g., 3.5 GHz) mobile network nodes, low-band (e.g., under 1 GHz) mobile network nodes, or a combination of mid-band and low-band mobile network nodes. In the case of network nodes 110 having Citizens Broadband Radio Service Device (CBSD) capability, allocations of CBRS spectrum are provided via a Spectrum Access System (SAS) 140.

The network nodes 110 may include those that use (or are compatible with) Wi-Fi network protocols to communicate with UE 105 via unlicensed spectrum, such as may be implemented as wireless access points deployed at home, business or other locations and configured to wirelessly communicate with and provide network services to UE 105 such as via 802.11xx or other Wi-Fi protocols. Thus, in various embodiments the network nodes 110 may uses Wi-Fi protocols, mobile network protocols, or a combination thereof within the context of licensed spectrum, unlicensed spectrum, or a combination of licensed and unlicensed spectrum.

Generally speaking, the access network 101 may comprise a multi-layered network wherein network nodes 110 of differing technologies provide overlapping coverage areas such that UE 105 and IoT devices 106 having multiple radio access capability may receive network services from different layers or portions of the network (i.e., CBSD of differing technologies). Thus, the network nodes 110 forming the access network 101 may comprise CBSD nodes or a mix of CBSD and non-CBSD nodes.

The core network 120 may comprise any type of access or core network, or network technology. As depicted in FIG. 1, the network nodes 110 of the access network 101 are depicted as being connected to a core network comprising, illustratively, an evolved packet core (EPC) 120 of a 4G/LTE network. It will be appreciated that the various embodiments are not limited to this type of network. Specifically, the various embodiments are suitable for use within the context of any type of core or access network, such as 3G/4G/LTE/5G networks and the like, wherein proprietary CBSD devices may be used/configured to provide network services thereto, such as from/to external networks 130. It will be appreciated that additional mobile networks, fixed wireless access networks, domains, groups, and/or other or additional deployments of network nodes as described herein are also contemplated in various embodiments.

Each network node 110 provides network services to proximate UE 105 and/or IoT devices 106 via respective radio bearer (channels/resources) which are managed by various Radio Resource Management functions, such as Radio Bearer Control, Radio Admission Control, Connection Mobility Control, Scheduling of UE/CPE in both uplink and downlink, assignment of bandwidth parts (BWPs) to UE/CPE and so on. The Radio Resource Management functions are configured to provide appropriate Quality of Service (QOS) levels to the UE/CPE using one or more radio bearers, such as to maximize throughput at the node 110 while maintaining "fairness" to the UE/CPE or IoT devices attached thereto, to monitor various performance metrics, to provide data to the core network or network management entities and the like.

Generally speaking, each of the CBSD and non-CBS the network nodes 110 utilizes defined defines frequency ranges (FRs), such as FR1 (~410 MHz to 7125 MHz), FR2 (~24.25 GHz to 52.6 GHZ), and so on. These frequency ranges may include both licensed and unlicensed spectrum as discussed elsewhere herein, where unlicensed spectrum includes CBRS spectral regions used by CBSD network nodes 110. Each of the spectral regions includes a plurality of operating bands, wherein each operating band is a frequency band associated with a certain set of radio frequency (RF) requirements.

Each network node 110 may include a Scheduler to implement uplink/downlink scheduling functions so as to allocate radio bearer resources to attached UE in accordance with allocated frequency bands. Further, each network node 110 may provide management data such as channel/frequency utilization level, congestion level, number of connected UE, number and type of network services being provided and so on to various management entities associated with the network operator.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IOT) devices (e.g., sensors, monitoring devices, alarm system devices and the like), and/or other types of wireless devices capable of communicating with the network nodes 110. The UE 105 may include UE that use licensed 3G/4G/LTE/5G spectrum, unlicensed spectrum such as CBRS spectrum, or a combination of licensed and unlicensed spectrum. In the case of network nodes 110 having CBSD capability, allocations of CBRS spectrum are provided via SAS 140.

The UE 105 may be configured to communicate directly with the network nodes 110, or via customer premises equipment (CPE) 107 such as wireless routers and other devices capable of communicating with both UE 105 and network nodes 110. Further, the CPE may also comprise CBSD CPE (e.g., a micro cell or WAP) such that SAS spectrum allocation and related management functions discussed herein with respect to the network nodes 110 are also used with such CBSD CPE.

While any type of core or access network or network technology may be used, the illustrative EPC 120 is depicted in a simplified manner as including, e.g., a service gateway (SGW) 122, a packet gateway (PGW) 126, a mobility management entity (MME) 124, and a Home Subscriber Server (HSS) 128. Various other functional elements associated with a typical EPC have been omitted for simplification of the discussion. Generally speaking, the EPC 120 supports various data plane (DP) functions and control plane (CP) functions, such as transport internet protocol (IP) data traffic (incoming and outgoing packets) between the network nodes 110 and external networks 130 (e.g., so as to support the delivery of various services to User Equipment (UE) 105 attached to the network nodes 110.

The SGW 122 is a point of interconnection between the radio-side (e.g., via a backhaul connection to the access network 101) and the EPC 120, and serves the UE 105 by routing the various incoming and outgoing IP packets. The SGW 122 is the anchor point for intra-LTE mobility (i.e. in case of handover between eNodeBs 110) and between LTE, 5G, and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for network access by UE 105. The MME 124 is responsible for the tracking and the paging of UE 105 in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

As depicted in FIG. 1, each of a plurality of Spectrum Access System (SASs) elements from respective SAS service providers 140-1 through 140-M (collectively SAS 140) communicates with one or more deployed CBSD network nodes 110 associated with that service provider, either directly or via a domain proxy. Each service provider's SAS 140 is configured to control access to the CBRS frequency band for RANs and other CBSD devices such as network nodes 110, UE 105, IoT networks 106, and other devices associated with that service provider. Generally speaking, each SAS 140 is configured to ensure that the CBRS frequency band is allocated for CBSD use, and that such use is adapted in accordance with government requirements, network congestion, network interference and the like.

As depicted, first service provider network nodes 110-11 and 110-12 communicate directly with first service provider SAS 140-1, second service provider network nodes 110-21 through 110-23 communicate with second service provider SAS 140-2 via a domain proxy 180 (110-21 and 110-22) or directly (110-23).

Thus, as depicted in FIG. 1, each CBSD network node 110 connects to a respective SAS directly or via a domain proxy based on CBSD design that varies among CBSD suppliers. Each CBSD network node 110 connects to one SAS at a time (one to one relationship). SAS-SAS communication may be provided to coordinate spectrum allocation. A single SAS 140 may be configured to service CBSD network nodes 110 associated with multiple service providers. An inter-SAS protocol may be used for message exchange between SASs 140, and as part of a daily Coordinated Periodic Activity Among SASs (CPAS) process.

As depicted in FIG. 1, several of the CBSD network node 110 comprise IoT CBSD nodes; namely, CBSD network node 110-12, 110-22 and 110-23. The depicted IoT CBSD nodes 110 comprise CBSD nodes 110 that do not require the minimum CBRS allocation of 10 MHz. The IoT CBSD nodes 110 utilize only a portion of the conventional minimum CBRS allocation, such as 200 kHz, 1.4 MHz, 5 MHz and so on as previously described. That is, the IoT CBSD nodes 110 do not require a conventional channel assignment of 10 MHz.

The various embodiments provide mechanisms supporting SAS channelization to slice, illustratively, 10 MHz channels into lower bandwidth portions/channels. To indicate a need for a lower bandwidth portion/channel, various embodiments utilize an updated version of a CBSD-SAS registration and spectrum grant process, such as that described in the WINNF-TS-0016 standards document. A CBSD-SAS message exchange and registration method in accordance with the embodiments will be described in more detail below with respect to FIG. 2.

Various elements or portions thereof depicted in FIG. 1 and having functions described herein are implemented at least in part as computing devices having communications capabilities, including for example the UE 105, network nodes 110, SAS 140, domain proxy 180, and various portions of the EPC 120. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network equipment used to support network operation/management functions at a network core or elsewhere in a provider network, the network equipment comprising processing resources (e.g., one or more servers, processors, and/or virtualized processing elements or compute resources) and non-transitory memory resources (e.g., one or more servers, storage devices, memories and/or virtualized memory or storage resources), wherein the processing resources are configured to execute software instructions stored in the non-transitory memory resources to provide thereby various functions, features, methods, management entities, and other embodiments or portions thereof as described herein.

The network equipment may also be used to provide some or all of the various other core network nodes or functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
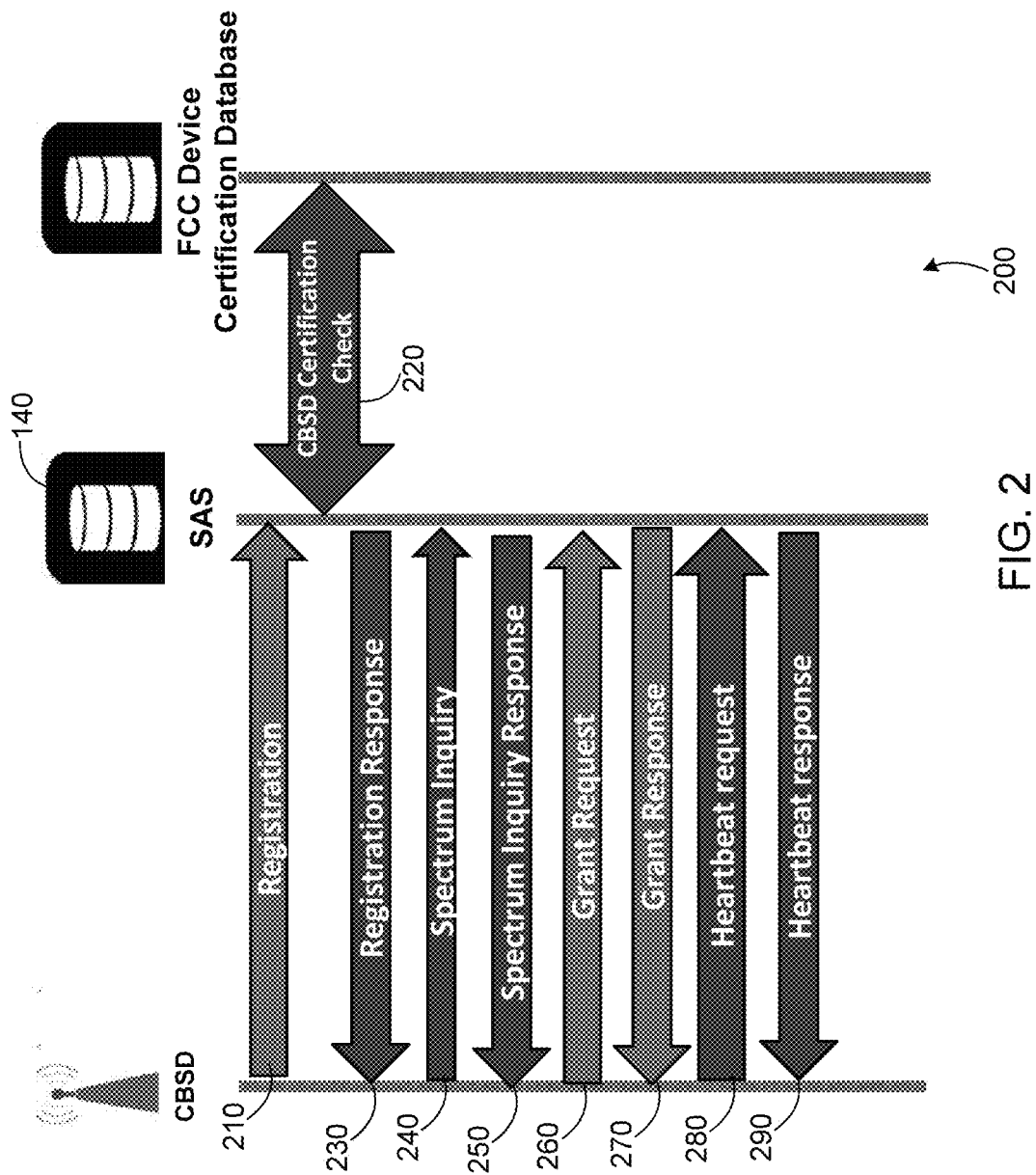
FIG. 2 depicts a flow diagram of a CBSD-SAS message exchange and registration method in accordance with the embodiments.

FIG. 2 depicts a flow diagram of a CBSD-SAS message exchange and registration method in accordance with the embodiments. In particular, the method 200 of FIG. 2 contemplates a CBSD-SAS call flow a (message exchange) and registration data process configured to enable registration of the CBSD to the SAS, and a CBRS spectrum grant by the SAS to the CBSD which may comprise a low bandwidth spectrum grant as discussed herein.

At step 210, a CBSD sends a registration request to the appropriate SAS directly or via a domain proxy. The registration request includes a new RadioType parameter used to convey to the SAS (optionally, to other network elements) a flag or bit sequence or alphanumeric sequence indicative of a radio type associated with the CBSD and useful in characterizing the bandwidth capability or requirements of the CBSD. For example, a "Broadband" radio type may be associated with CBSD normally requiring a conventional spectrum grant such as 10 MHz or 20 MHz, while a "IoT" radio type may be associated with CBSD requiring less than the conventional spectrum grant such as 200 KHZ, 1.4 MHz, 5 MHz, and the like.

The RadioType parameter may be provided by modifying or adapting any of the various parameters or objects to include or allow for the inclusion of the RadioType parameter. Such parameters/objects that may be modified or adapted to include the Radio Type parameter may include parameters/objects such as InstallationParam, cbsdCategory, cbsdInfo, airInterface, installationParam, and the like. All that is needed is for the RadioType parameter to be communicated from the CBSD to the SAS for processing. For example, step 210 may be implemented by an IoT CBSD transmitting to an SAS a CBSD registration request including a RegistrationRequest object including therein a RadioType parameter indicating that the CBSD is of an "IoT" radio type. Other information transmitted by the CBSD to the SAS as part of the RegistrationRequest may comprise, illustratively, userId, feeId, cbsdSerialNumber, callSign, cbsdCategory, cbsdInfo, airInterface, installationParam, measCapability, groupingParam) and so on.

For CBSD having a RadioType parameter set to "Broadband" the SAS continues operating in a conventional manner by considering spectrum in terms of 10 MHz or 20 MHz blocks, such as for spectrum grant and grant relinquishment, operations, spectrum aggregation operations, and so on. That is, the SAS operates in a conventional manner if all of the CBSD registering with the SAS are conventional in terms of spectrum requirements.

For CBSD having a RadioType parameter set to "IoT" the SAS modifies its operation by considering spectrum in terms of smaller blocks of spectrum, such as for spectrum grant and grant relinquishment, operations, spectrum aggregation operations, and so on. In essence, the SAS operates in a non-conventional manner if one or more of the CBSD registering with the SAS is non-conventional in terms of spectrum requirements, as discussed herein.

Various embodiments contemplate two modes of IoT-related SAS operation; namely, a stand-alone mode of operation and a guard-band mode of operation. These modes of operation are related to SAS management of spectral resources, such as defining, granting, recapturing, combining, and otherwise delineating spectral resources for the benefit of CBSD associated with the SAS.

In the stand-alone mode of operation, IoT networks (e.g., an IoT CBSD node 110) may be deployed with a relatively small bandwidth allocation, such as 1.4 MHz for Cat-M1 networks, 5 MHz for Cat-M2 networks, 200 kHz for NB-IOT networks, and so on. In this mode of operation, an available 5 MHz or 10 MHz channel is sliced into smaller spectral chunks or sub-channels of 5 MHz, 1.4 Mhz, and/or 200 Khz so as to efficiently support a dedicated IoT network deployment.

In particular, IoT-related SAS operation comprises considering normally allocable spectrum in much smaller chunks than 5 MHz, such as by considering at least one of the 5 MHz chunks as instead a plurality of smaller chunks, illustratively three 1.4 mHz chunks and four 200 kHz chunks, or two 1.4 mHz chunks and eleven 200 kHz chunks, etc.

In the guard-band alone mode of operation, guard bands between 5 MHz or 10 MHz channels (available or occupied)

is used to support 200 kHz assignments to NB-IOT networks. This option is particularly useful when all the CBRS channels are occupied, since NB-IOT may still be deployed using the guard-band channel assignments.

In particular, IoT-related SAS operation comprises considering the normally non-allocable spectrum used as guard band between 5 MHz allocable spectral regions as being available for allocation to IoT CBSD. If a guard band comprises a 200 kHz guard band, then use of that guard band may be granted to an IoT CBSD (i.e., RadioType parameter set to "IoT").

At step 220, the SAS interacts with an FCC database to retrieve CBSD certification status of the requesting CBSD in accordance with, illustratively, the fccId of the CBSD.

At step 230, the SAS sends to the CBSD a registration response indicating whether the registration of the CBSD with the SAS succeeded or failed.

At step 240, the CBSD send to the SAS a Spectrum Inquiry request to check for available spectrum. For example, the CBSD may send a SpectrumInquiryRequest object comprising, illustratively, cbsdId, inquiredSpectrum, measReport and/or other parameters/objects. The cbsdId parameter identifies the CBSD to the SAS. The inquiredSpectrum parameter is an array of FrequencyRange objects indicating the frequency range(s) for which the CBSD seeks information (which may include one or more frequency ranges). The measReport parameter provides a means for the CBSD to report measurement results.

At step 250, the SAS send a Spectrum Inquiry response to the CBSD indicating whether the requested spectrum is available or not.

At step 260, the CBSD sends to the SAS a Grant request based on the amount of spectrum associated with the CBSD, illustratively an amount of spectrum suitable for use for lower bandwidth operations such as IoT operations (e.g., 200 kHz for narrow band IoT (NB-IoT), 1.4 MHz for Cat-M1, 5 MHz for Cat-M2, and so on). For example, the CBSD may send a GrantRequest object comprising, illustratively, cbsdId, operationParam, measReport and/or other parameters/objects. The cbsdId parameter identifies the CBSD to the SAS. The operationParam parameter contains the details of the Grant request including the CBSD maximum Effective Isotropic Radiated Power (EIRP) and the desired frequency range for use as described.

At step 270, the SAS sends a Grant Response to the CBSD which identifies for the CBSD the granted frequencies it may use for, illustratively, IoT operations. That is, if the Grant request is approved, a new Grant is created for the benefit of the CBSD with the operational parameters and a channel configured to provide the desired amount of spectrum, such as for an IoT device or network of IoT devices.

At step 280, the CBSD sends to the SAS heartbeat request.

At step 290, the SAS authorizes the CBSD by sending the heartbeat response with flag AUTHORIZED.

Figure 3:
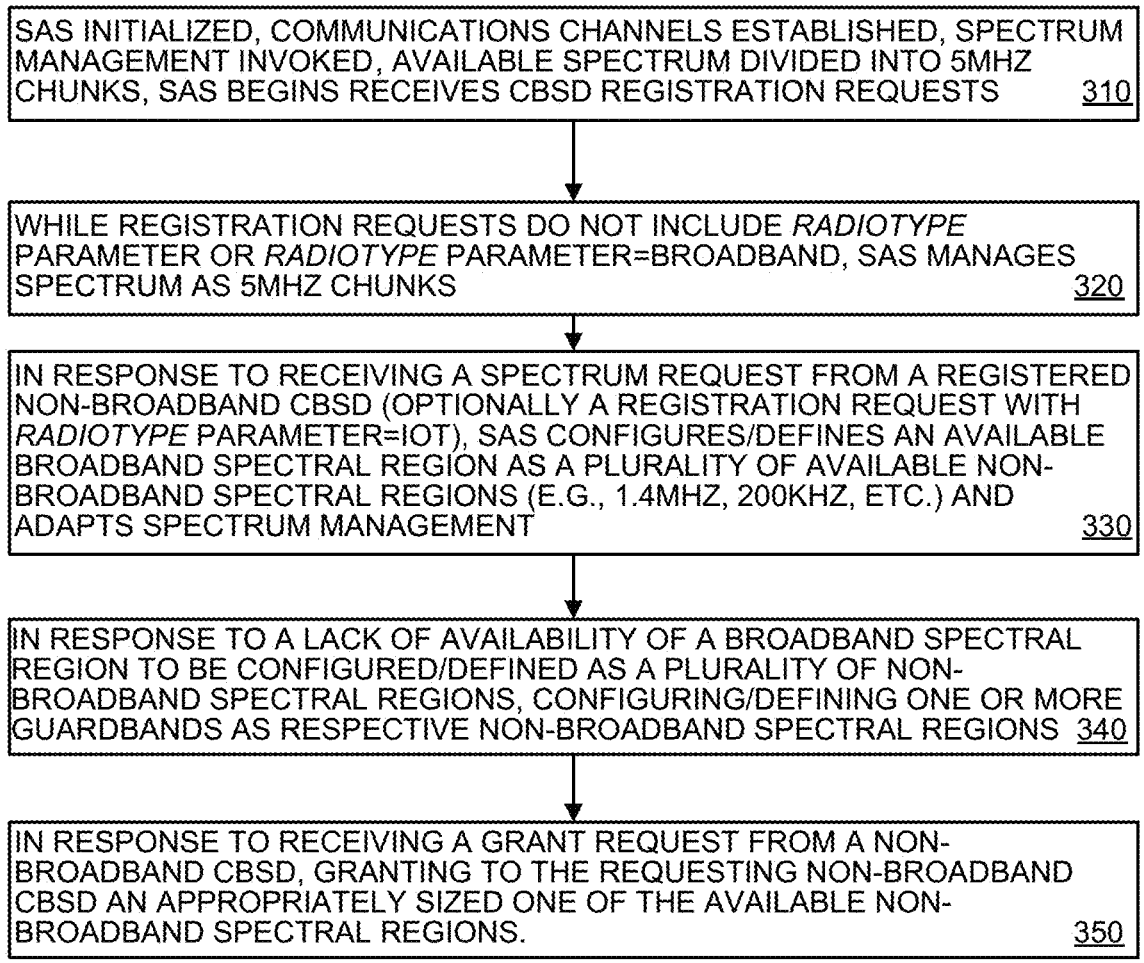
FIG. 3 depicts a flow diagram of an SAS operational adaptation method in accordance with the embodiments.

FIG. 3 depicts a flow diagram of an SAS operational adaptation method in accordance with the embodiments. Specifically, the method 300 of FIG. 3 depicts various operational adaptations of an SAS in response to an indicated need by CBSD for non-broadband spectrum usage.

At step 310, an SAS is initialized, communications channels established, spectrum management invoked, available spectrum divided into 5 MHz chunks, and generally made available to begin receiving and processing CBSD registration requests.

At step 320, while CBSD registration requests being received and processed comprise registration requests that do not include a RadioType parameter or include a RadioType parameter indicative of a "Broadband" radio type, the SAS continues to manage available spectrum as 5 MHz chunks.

At step 330, in response to receiving a spectrum request from a registered non-broadband CBSD (optionally, a registration request including a RadioType parameter indicative of a "Non-Broadband" or "IoT" radio type), the SAS begins operating in a stand-alone mode of operation wherein an available broadband spectral region (e.g., 5 MHz) is configured or defined for management purposes as a plurality of available non-broadband spectral regions (e.g., 1.4 MHz, 200 kHz, etc.) and managed for the benefit of CBSD allocations and the like in this configuration.

At step 340, in response to a lack of availability of a broadband spectral region to be configured/defined as a plurality of non-broadband spectral regions, configuring/defining one or more guard bands associated with broadband spectral regions as respective non-broadband spectral regions for management purposes.

At step 350, in response to receiving a grant request from a registered non-broadband CBSD, the SAS grants to the requesting registered non-broadband CBSD an appropriately sized one of the available non-broadband spectral regions.

The methods 200/300 (of FIGS. 2 and 3), and other embodiments, contemplate CBSD registration request messages and SAS registration response messages, CBSD spectrum inquiry request messages and SAS spectrum inquiry response messages, CBSD grant request messages and SAS grant response messages. While not discussed in significant detail, these methods 200/300 and other embodiments additionally contemplate CBSD heartbeat request messages and SAS heartbeat response messages, CBSD relinquishment request messages and SAS relinquishment response messages, and CBSD deregistration request messages and SAS deregistration response messages such as discussed within the context of WINNF-TS-0016 and/or other relevant documents. Further, the various SAS 140 manage/maintain spectrum availability by terminating spectrum grants with CBSD, sharing information with other CBSD pertaining to available spectrum (e.g., such as where overlapping footprints of proximate CBSDs from different service providers exist), and so on such as discussed herein.

The various embodiments include a method, comprising: receiving, at a spectrum access server (SAS), a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD; in response to receiving a spectrum inquiry request from a registered non-broadband CBSD, configuring an available broadband spectral region as a plurality of available non-broadband spectral regions; and in response to receiving a grant request from a non-broadband CBSD, granting to the requesting non-broadband CBSD an appropriately sized one of the available non-broadband spectral regions.

The various embodiments include a spectrum access server (SAS) configured to communicate with a plurality of Citizens Broadband Radio Service Devices (CBSDs), the SAS comprising processing resources configured to execute software instructions stored in non-transitory memory resources to provide thereby a method, comprising: receiving a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD; in response to receiving a spectrum inquiry request from a non-broadband CBSD, configuring an available broadband spectral region as a plurality of available non-broadband spectral regions; and in response to receiving a grant request from a non-broadband CBSD, granting to the requesting non-broadband CBSD an appropriately sized one of the available non-broadband spectral regions.

The non-broadband spectral regions may comprise at least one of 200 kHz and 1.4 MHz spectral regions within a 5 MHz broadband spectral region. The 5 MHz broadband spectral region may be configured to provide three 1.4 MHz non-broadband spectral regions and four 200 kHz non-broadband spectral regions. The Radio Type parameter may be included within an InstallationParam associated with a CBSD registration request. The Radio Type parameter may be included within at least one of an InstallationParam, cbsdCategory, cbsdInfo, airInterface, and installationParam associated with a CBSD registration request.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method, comprising:
    receiving, at a spectrum access server (SAS), a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD;
    in response to receiving a spectrum inquiry request from a registered non-broadband CBSD, configuring an available broadband spectral region as a plurality of available non-broadband spectral regions; and
    in response to receiving a grant request from a non-broadband CBSD, granting to the requesting non-broadband CBSD an appropriately sized one of the plurality of available non-broadband spectral regions.

2. The method of claim 1, wherein the plurality of available non-broadband spectral regions comprise at least one of 200 kHz and 1.4 MHz spectral regions within a 5 MHz broadband spectral region.

3. The method of claim 1, wherein the 5 MHz broadband spectral region is configured to provide three 1.4 MHz non-broadband spectral regions and four 200 kHz non-broadband spectral regions.

4. The method of claim 1, wherein the Radio Type parameter is included within an InstallationParam associated with a CBSD registration request.

5. The method of claim 1, wherein the Radio Type parameter is included within at least one of an InstallationParam, cbsdCategory, cbsdInfo, airInterface, and installationParam associated with a CBSD registration request.

6. The method of claim 1, wherein the non-broadband CBSD comprises an Internet of Things (IOT) CBSD configured to communicate with one or more IoT sensors.

7. The method of claim 1, wherein the non-broadband CBSD comprises an Internet of Things (IOT) CBSD configured to communicate with a plurality of IoT sensors within a network of IoT sensors.

8. The method of claim 1, wherein the non-broadband CBSD communicates with the SAS via a domain proxy.

9. The method of claim 1, wherein the broadband CBSD comprises CBSD configured to communicate with user equipment (UE) and customer premises equipment (CPE) requiring at least 5 MHz of spectrum.

10. A spectrum access server (SAS), configured to communicate with a plurality of Citizens Broadband Radio Service Devices (CBSDs), the SAS comprising processing resources configured to execute software instructions stored in non-transitory memory resources to provide thereby a method, comprising:
    receiving a Citizens Broadband Radio Service Device (CBSD) registration request including a source identification and Radio Type parameter associated with a requesting CBSD, the Radio Type parameter being indicative of whether the CBSD comprises a broadband CBSD or non-broadband CBSD;
    in response to receiving a spectrum inquiry request from a non-broadband CBSD, configuring an available broadband spectral region as a plurality of available non-broadband spectral regions; and
    in response to receiving a grant request from a non-broadband CBSD, granting to the requesting non-broadband CBSD an appropriately sized one of the available non-broadband spectral regions.

11. The SAS of claim 10, wherein the non-broadband spectral regions comprise at least one of 200 kHz and 1.4 MHz spectral regions within a 5 MHz broadband spectral region.

12. The SAS of claim 10, wherein the 5 MHz broadband spectral region is configured to provide three 1.4 MHz non-broadband spectral regions and four 200 kHz non-broadband spectral regions.

13. The SAS of claim 10, wherein the Radio Type parameter is included within an InstallationParam associated with a CBSD registration request.

14. The SAS of claim 10, wherein the Radio Type parameter is included within at least one of an InstallationParam, cbsdCategory, cbsdInfo, airInterface, and installationParam associated with a CBSD registration request.

15. The SAS of claim 10, wherein the SAS receives CBSD requests via a domain proxy.

16. The SAS of claim 10, wherein non-broadband CBSD comprise Internet of Things (IoT) CBSD configured to communicate with one or more IoT sensors.

17. The SAS of claim 10, wherein the non-broadband CBSD comprises an Internet of Things (IOT) CBSD configured to communicate with a plurality of IoT sensors within a network of IoT sensors.

18. The SAS of claim 10, wherein the non-broadband CBSD communicates with the SAS via a domain proxy.

19. The SAS of claim 10, wherein the broadband CBSD comprises CBSD configured to communicate with user equipment (UE) and customer premises equipment (CPE) requiring at least 5 MHz of spectrum.

20. A system, comprising:
- at least two spectrum access servers (SASs), each SAS associated with a respective service provider and configured to communicate with Citizens Broadband Radio Service Devices (CBSDs) associated with the respective service provider;
- each SAS receiving, from associated CBSDs, registration requests including a source identification and Radio Type parameter associated with a requesting CBSD, the Radio Type parameter being indicative of whether the CBSD comprises a broadband CBSD or non-broadband CBSD;
- each SAS, in response to receiving a spectrum inquiry request from an associated non-broadband CBSD, configuring an available broadband spectral region as a plurality of available non-broadband spectral regions; and
- each SAS, in response to receiving a grant request from an associated non-broadband CBSD, granting to the requesting non-broadband CBSD an appropriately sized one of the plurality of available non-broadband spectral regions.

* * * * *